United States Patent
Nagaoka et al.

(10) Patent No.: US 7,515,737 B2
(45) Date of Patent: Apr. 7, 2009

(54) VEHICLE SURROUNDINGS MONITORING APPARATUS

(75) Inventors: Nobuharu Nagaoka, Wako (JP); Takayuki Tsuji, Wako (JP); Masakazu Saka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 676 days.

(21) Appl. No.: 11/287,873

(22) Filed: Nov. 28, 2005

(65) Prior Publication Data

US 2006/0115122 A1 Jun. 1, 2006

(30) Foreign Application Priority Data

Nov. 30, 2004 (JP) ............... 2004-347330

(51) Int. Cl.
*G06K 9/00* (2006.01)
*G05D 1/02* (2006.01)

(52) U.S. Cl. ...................... 382/104; 701/300

(58) Field of Classification Search ........... 382/103, 382/104, 106, 140, 190, 209; 348/113, 118, 348/148, 149, 180, 184, 211.8, 211.13, 837; 340/3.1, 3.9, 435, 573.3, 901, 902, 903, 904, 340/932, 933, 935, 938, 988, 991, 995.1, 340/995.17; 701/1, 49, 300
See application file for complete search history.

(56) References Cited

U.S. PATENT DOCUMENTS

| | | | |
|---|---|---|---|
| 6,327,536 B1 * | 12/2001 | Tsuji et al. ............... 701/301 |
| 6,531,959 B1 * | 3/2003 | Nagaoka et al. ............ 340/435 |
| 7,130,448 B2 | 10/2006 | Nagaoka et al. |
| 7,141,796 B2 * | 11/2006 | Hattori et al. .......... 250/370.08 |
| 2001/0002936 A1 | 6/2001 | Tsuji et al. |
| 2003/0007074 A1 | 1/2003 | Nagaoka et al. |
| 2003/0137593 A1 | 7/2003 | Watanabe et al. |
| 2004/0183906 A1 | 9/2004 | Nagaoka et al. |
| 2005/0063565 A1 | 3/2005 | Nagaoka et al. |
| 2005/0276447 A1 | 12/2005 | Taniguchi et al. |
| 2005/0276450 A1 | 12/2005 | Taniguchi et al. |
| 2006/0126896 A1 | 6/2006 | Nagaoka et al. |

FOREIGN PATENT DOCUMENTS

DE 100 33 599 A 1 2/2001

(Continued)

*Primary Examiner*—Abolfazl Tabatabai
(74) *Attorney, Agent, or Firm*—Carrier, Blackman & Associates, P.C.; Joseph P. Carrier; William D. Blackman (57) ABSTRACT

A vehicle surroundings monitoring apparatus that extracts a body present in the surroundings of a vehicle as an object, based on an image captured by an infrared imaging device including a binarized object extraction device that extracts a binarized object from image data obtained by binarizing a gray scale image of the image; a region setting device that sets a region including at least a portion of the binarized object on the gray scale image; a luminance status quantity calculation device that calculates a luminance status quantity of the region; an interval status quantity calculation device that calculates an interval status quantity according to an interval between a position of a substantially maximum luminance value and a position of a substantially minimum luminance value within the region based on the luminance status quantity; and an object type determination device that determines a type of the object based on the interval status quantity.

5 Claims, 10 Drawing Sheets

FOREIGN PATENT DOCUMENTS

| | | |
|---|---|---|
| DE | 102 28 638 A1 | 1/2003 |
| DE | 102 47 371 A1 | 7/2003 |
| DE | 103 01 469 A1 | 9/2003 |
| DE | 103 01 468 A1 | 10/2003 |
| DE | 10 2004 012 811 A1 | 11/2004 |
| DE | 10 2004 041 919 A1 | 4/2005 |
| DE | 10 2005 026 875 A1 | 1/2006 |
| DE | 10 2005 026 876 A1 | 6/2006 |
| EP | 1 245 443 A2 | 10/2002 |
| JP | 59-083078 | 5/1984 |
| JP | 63-134990 | 6/1988 |
| JP | 5-9755 | 2/1993 |
| JP | 6-100661 | 12/1994 |
| JP | 8-313632 | 11/1996 |
| JP | 11-328364 | 11/1999 |
| JP | 2000-030197 | 1/2000 |
| JP | 2001-6096 | 1/2001 |
| JP | 2001-211449 | 8/2001 |
| JP | 2001-351200 | 12/2001 |
| JP | 2003-216937 | 7/2003 |
| JP | 2004-258927 | 9/2004 |
| JP | 2006-185433 | 7/2006 |

* cited by examiner

VEHICLE SURROUNDINGS MONITORING APPARATUS

BACKGROUND OF THE INVENTION

1. Field of the Invention

The present invention relates to a vehicle surroundings monitoring apparatus that extracts objects by performing binarization processing of images taken by infrared cameras.

Priority is claimed on Japanese Patent Application Publication No. 2004-347330, filed Nov. 30, 2004, the content of which is incorporated herein by reference.

2. Description of Related Art

Conventionally, a display processing device is known in which an object such as a pedestrian with a possibility of colliding with a vehicle is extracted from an infrared image of a vehicles surroundings captured by an infrared camera, and information of this object is provided to the driver (for example, see Japanese Unexamined Patent Application, First Publication No. H11-328364).

This display processing device searches a region (binarized object) where bright parts are concentrated by binarizing the infrared image, and determines whether or not the binarized object is a pedestrian's head based on the distance calculated from an aspect ratio or filling factor of the binarized object, and also an actual area and a center of gravity on the infrared image. Then, the height of the pedestrian on the infrared image is calculated from the distance between the head part region of the pedestrian and the infrared camera, and an average height of adult persons, and a body region containing the body of a pedestrian is set. By separating and displaying the head region and body region from other regions, visual aid for the driver is performed with respect to a pedestrian.

Incidentally, since the display processing device of the example of the related art mentioned above detects a pedestrian based on determination of the shape for a head part region or body part region on the infrared image, it may become difficult to distinguish a pedestrian from a manmade structure that has a shape of a pedestrian, and particularly a similar shape, size, and position height of the pedestrian's head and that emits heat.

SUMMARY OF THE INVENTION

The present invention takes into consideration the above-mentioned circumstances, with an object of providing a vehicle surroundings monitoring apparatus that is capable of precisely distinguishing and extracting a pedestrian and a manmade structure on an infrared image.

In order to solve the above problem and achieve the related object, the present invention provides a vehicle surroundings monitoring apparatus that extracts a body present in the surroundings of a vehicle as an object, based on an image captured by an infrared imaging device including a binarized object extraction device that extracts binarized objects from image data obtained by binarizing gray scale images of the images; a region setting device that sets a region including at least a portion of the binarized object extracted by the binarized object extraction device on the gray scale image; a luminance status quantity calculation device that calculates a luminance status quantity of the region set by the region setting device; an interval status quantity calculation device that calculates an interval status quantity according to an interval between a position of a substantially maximum luminance value and a position of a substantially minimum luminance value within the region based on the luminance status quantity calculated by the luminance status quantity calculation device; and an object type determination device that determines a type of the object based on the interval status quantity calculated by the interval status quantity calculation device.

According to the aforementioned vehicle surroundings monitoring apparatus, the luminance status quantity calculation device calculates fluctuations in an average value of the luminance value along the horizontal direction (horizontal average luminance) for each vertical position on for instance a gray scale image as the luminance status quantity in the region set by the region setting device. The interval status quantity calculation device calculates for instance the length of an interval or the luminance distribution status in the interval as the interval status quantity according to the interval between the position of the approximately maximum luminance value and the position of the approximately minimum luminance value within the region based on the luminance status quantity. When the calculated interval status quantity exceeds a predetermined range allowed as physical features of a human body, for example, when the length of the interval is excessively long, it can be precisely distinguished as being a manmade structure.

The interval status quantity may be the length of the interval. In this case, a manmade structure and something other than a manmade structure can be precisely distinguished based on the length of the interval complying with the distribution state of the relative value of the luminance value in the region regardless of the absolute value.

The vehicle surroundings monitoring apparatus may further include a prescribed region setting device that sets a prescribed region according to the binarized object extracted by the binarized object extraction device on the gray scale image, based on the luminance status quantity calculated by the luminance status quantity calculation device; an aspect ratio calculation device that calculates the aspect ratio of the prescribed region set by the prescribed region setting device; and an aspect ratio determination device that determines whether or not the aspect ratio calculated by the aspect ratio calculation device is not less than a prescribed upper limit or not more than a lower limit, wherein the object type determination device determines the type of the object based on the determination result of the aspect ratio determination device, in addition to the interval status quantity calculated by the interval status quantity calculation device.

According to the above vehicle surroundings monitoring apparatus, when the aspect ratio of the binarized object exceeds the predetermined range allowed as physical features of a human body, for example, when excessively narrow or wide in contrast to the aspect ratio of a person's head, which has a value of approximately 1, it can be precisely distinguished as being a manmade structure. Thereby, the degree of reliability in determining the type of object can be enhanced based on the aspect ratio in addition to the interval status quantity.

Furthermore, the vehicle surroundings monitoring apparatus may further include a pedestrian recognition device that recognizes pedestrians present in the surroundings of a vehicle based on the image, the pedestrian recognition device executing pedestrian recognition processing on the object when the object is determined to be something other than a manmade structure, or to be a pedestrian, by the object type determination device.

According to the above vehicle surroundings monitoring apparatus, pedestrian recognition accuracy can be improved by performing the pedestrian recognition processing for the object determined to be something other than a manmade structure as well as for the object determined to be a pedestrian.

Furthermore, the vehicle surroundings monitoring apparatus may further include a warning output device that outputs a warning directed to the object when the object is determined by the object type determination device to be something other than a manmade structure or to be a pedestrian.

According to the above vehicle surroundings monitoring apparatus, since a warning can be output for an object determined to be something other than a manmade structure as well as an object determined to be a pedestrian, unnecessary warnings for a manmade structure can be avoided.

DETAILED DESCRIPTION OF THE INVENTION

Hereunder, a vehicle surroundings monitoring apparatus according to one embodiment of the present invention is described with reference to the drawings.

Figure 1:
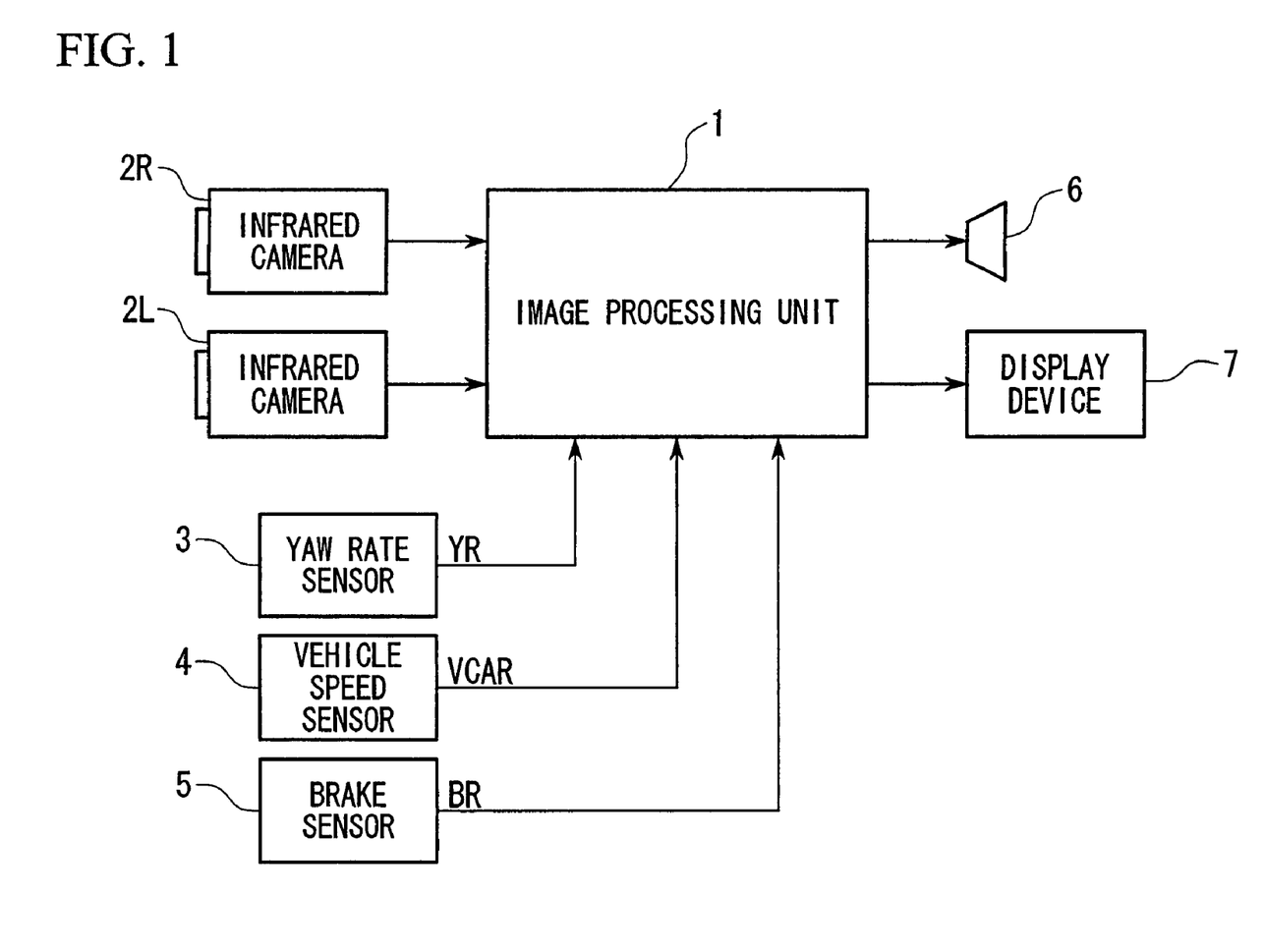
FIG. 1 is a block diagram showing the construction of a vehicle surroundings monitoring apparatus according to an embodiment of the present invention.

The vehicle surroundings monitoring apparatus according to the present embodiment, for example as shown in FIG. 1, includes: an image processing unit 1 equipped with a CPU (Central Processing Unit) that controls the vehicle surroundings monitoring apparatus; two infrared cameras 2R and 2L that are capable of detecting distant infrared radiation; a yaw rate sensor 3 that detects the yaw rate of the vehicle; a vehicle speed sensor 4 that detects the traveling speed of the vehicle; a brake sensor 5 that detects a driver's braking operation; a speaker 6; and a display device 7. For example, the image processing unit 1 detects a moving object such as a pedestrian or an animal in front of the vehicle in its traveling direction from infrared images of the surroundings of the vehicle that are captured by the two infrared cameras 2R and 2L, and from detection signals relating to the traveling status of the vehicle that are detected by each of the sensors 3, 4, and 5. In the case where the possibility of a collision between the detected moving object and the vehicle is determined, a warning is output via the speaker 6 or the display device 7.

Moreover, the display device 7 is, for example, constructed including a display device integrated with gauges that display various traveling states of the vehicle, a display device such as a navigation device, and furthermore an HUD (Head Up Display) 7a that displays various information at a position on the front window where the field of front vision of the driver is not impaired.

In addition, the image processing unit 1 includes an A/D converter, that converts input analog signals to digital signals, an image memory, that stores digitized image signals, a CPU (central processing unit), that performs various arithmetic processing, a RAM (Random Access Memory), that is used for storing data in the middle of the arithmetic processing, a ROM (Read Only Memory), that stores programs that are performed by the CPU, and tables, maps and the like, and an output circuit that outputs drive signals for the speaker 6 and display signals for the HUD 7a. The image-processing unit 1 is constructed such that the output signals of the infrared cameras 2R and 2L, and the respective sensors, 3, 4, and 5 are input into the CPU after being converted to digital signals.

Figure 2:
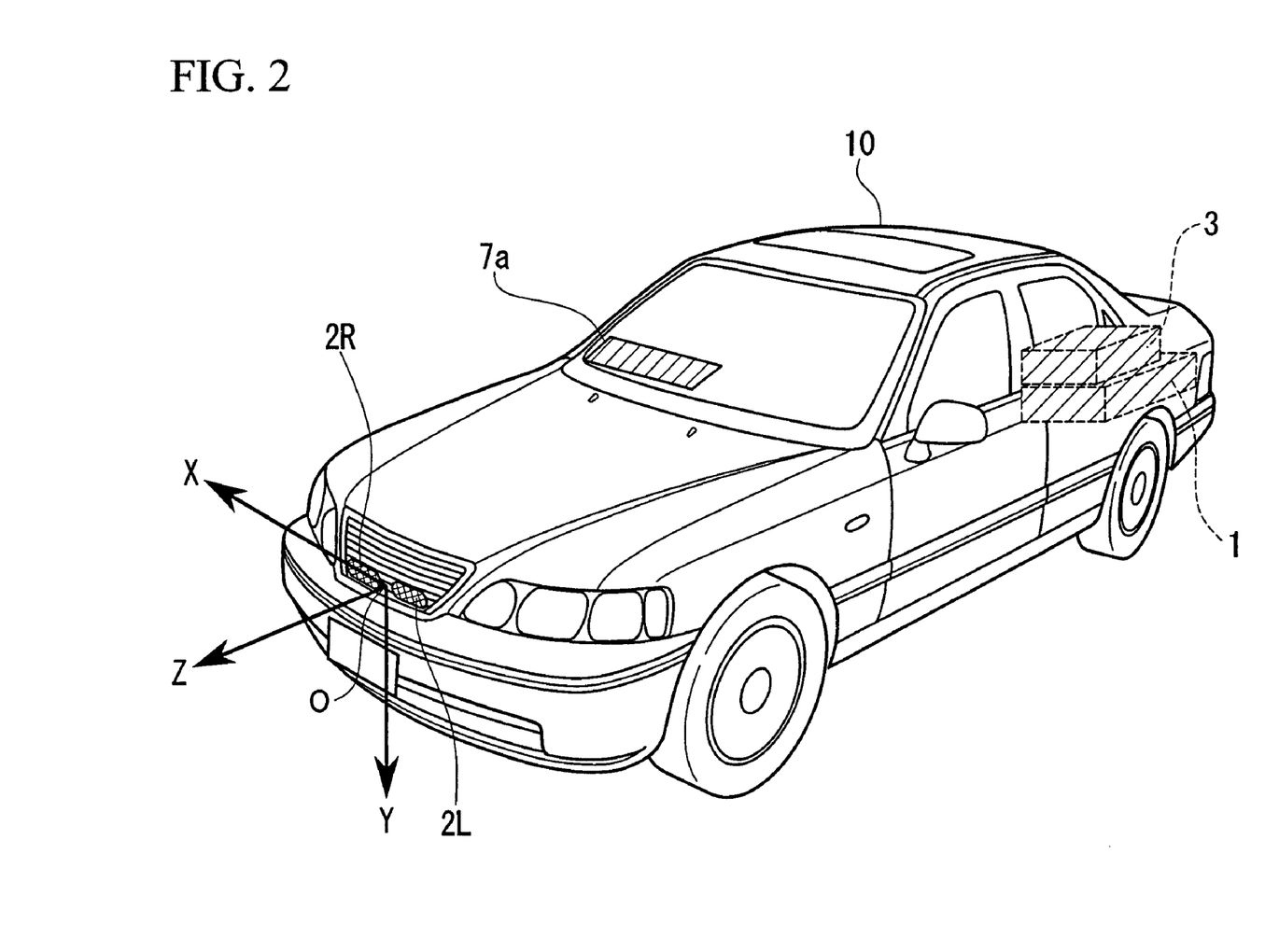
FIG. 2 is a diagram showing a vehicle equipped with the vehicle surroundings monitoring apparatus shown in FIG. 1.

Furthermore, as shown in FIG. 2, two infrared cameras 2R and 2L are disposed at the front of the vehicle 10 at positions symmetrical in the width direction relative to the central axis of the vehicle 10. The optical axes of both cameras 2R and 2L are parallel to each other, and both infrared cameras 2R and 2L are secured at the same height from the road surface. A characteristic of the infrared cameras 2R and 2L is that the output signal level (that is, luminance) increases as the temperature of the object increases.

Moreover, the HUD 7a is provided so as to display the images at a position on the front window of the vehicle 10, where the field of front vision of the driver is not impaired.

The vehicle surroundings monitoring apparatus according to the present embodiment is provided with the construction described above. Next, the operation of the vehicle surroundings monitoring apparatus is described, with reference to the drawings.

The operations in the image processing unit 1 for the detection of an object such as a pedestrian, and outputting a warning, are described below.

Figure 3:
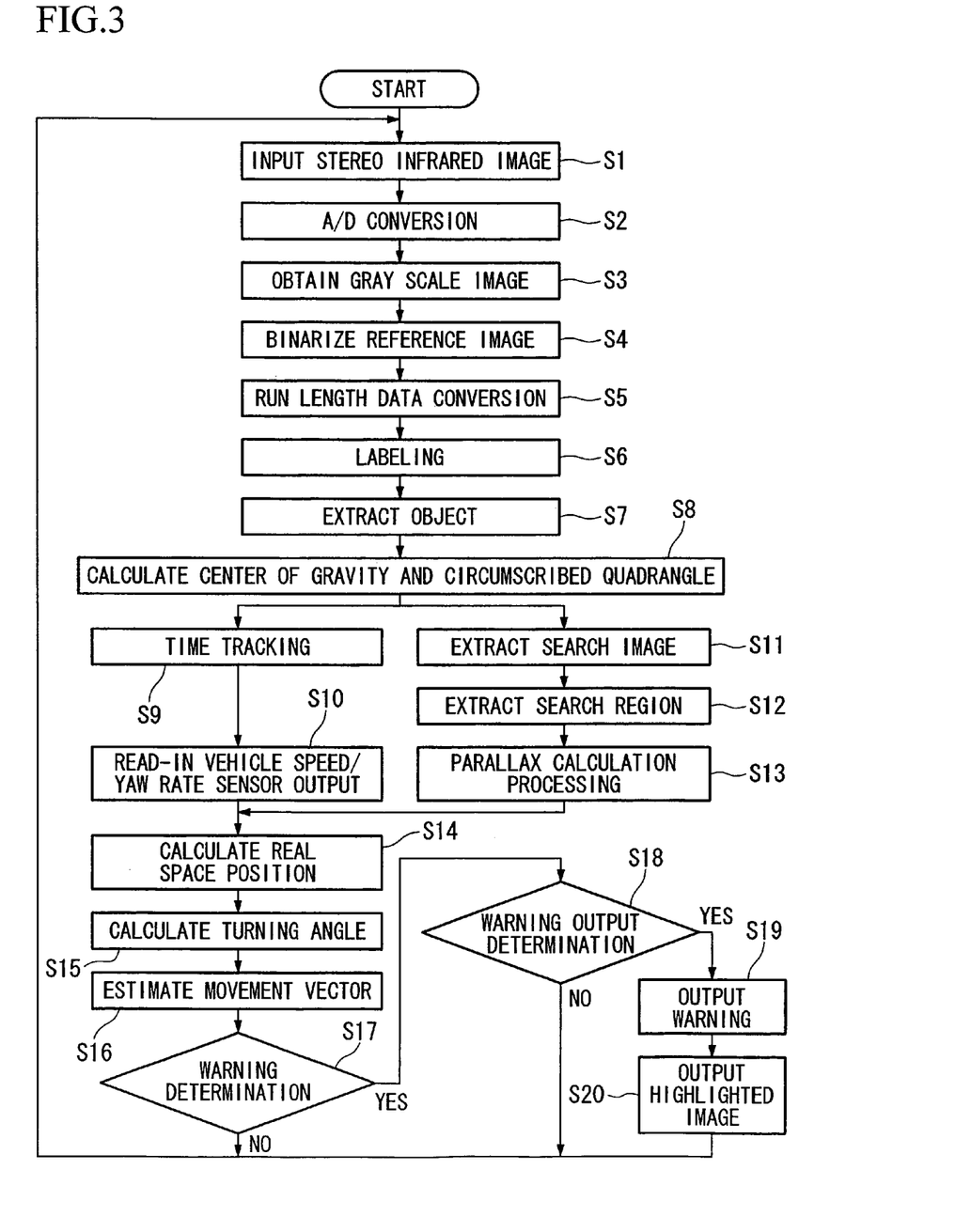
FIG. 3 is a flowchart showing the operations of the vehicle surroundings monitoring apparatus shown in FIG. 1.

First of all, in step S1 shown in FIG. 3, the image processing unit 1 obtains infrared images, which are the output signals from the infrared cameras 2R and 2L.

Next, in step S2, A/D conversion of the obtained images is performed.

Next, in step S3, a gray scale image containing half tone gradation information is obtained, and stored in an image memory. Here the infrared camera 2R acquires the right image and the infrared camera 2L acquires the left image. Furthermore, because in the right image and the left image the horizontal position on the display screen for the same object appears displaced, this displacement (that is, parallax) enables calculation of the distance from the vehicle 10 to the object.

Next in step S4, the right image obtained by the infrared camera 2R is assigned as the reference image, and binarization processing of this image signal is performed, that is, regions brighter than a predetermined luminance threshold value ITH are set to "1" (white), and darker regions are set to "0" (black).

The processing of steps S4 through S9 above is executed for the reference image obtained from the binarization processing (for example, the right image).

Next, in step S5, the image data obtained as a result of binarization processing for the infrared images is converted into run length data. In the run length data, regions that have become white as a result of the binarization processing are displayed as lines at the pixel level. Each line is set to have the width of one pixel in the y direction and the length of an appropriate number of pixels in the x direction.

Next, in step S6, labeling of the object is performed for the image data converted into the run length data.

Next, in step S7, the object is extracted according to the labeling of the object. Here, in the case where lines including equal x direction coordinates are adjacent to each other among respective lines of the run length data, the adjacent lines are recognized to be forming a single object.

Next, in step S8, the center of gravity G of the extracted object, the area S, and the aspect ratio ASPECT of the circumscribed quadrangles are calculated. Here, the areas S are calculated by adding the lengths (run (i)−1) of each run length data for the same object, assuming that the run length data of the object labeled A is (x (i), y (i), run (i), A) (i=0, 1, 2, . . . , N−1; where N is an arbitrary nonnegative integer).

Furthermore, the coordinates (xc, yc) of the center of gravity G of the object labeled A are calculated by multiplying the length (run (i)−1) of each run length data by the coordinates x (i) or y (i) (that is, (run (i)−1)×x(i) or (run (i)−1)×y (i)), adding the multiplication products for the same object, and dividing the result by the area S.

In addition, the aspect ratio ASPECT is calculated as the ratio Dy/Dx of the length Dy in the vertical direction of a quadrangle circumscribed around the object labeled A against the length Dx in the horizontal direction.

Since the run length data is represented by the number of pixels (number of coordinates) (=run (i)), it is necessary to subtract 1 from the actual length (=run (i)−1). Furthermore, the coordinate of the center of gravity G can be substituted for the center of gravity of the circumscribed quadrangle of the object.

Next, the processing of step S9 and step S10, and the processing of step S11 to step S13 are performed in parallel.

First of all, in step S9, time tracking of the object is performed, that is, the same object is recognized in each sampling period. The time tracking is performed to determine whether two objects A and B extracted at time k, which is an analog time t discrete within a sampling period, are the same as the bodies C and D, which are extracted at the discrete time (k+1). When it is determined that the objects A and B are the same as the objects C and D, the objects C and D are relabeled as objects A and B. Then, the coordinates of each object that has been recognized (for example, the center of gravity) are stored in the memory as time series position data.

Next, in step S110, the vehicle speed VCAR detected by the vehicle speed sensor 4 and the yaw rate YR detected by the yaw rate sensor 3 are obtained, and by taking the time integral of the yaw rate YR, the turning angle θr of the vehicle 10 is calculated.

Meanwhile, in parallel to the processing in step S9 and step S10, processing for calculating the distance z between the object and the vehicle 10 is performed in step S11 through step S13. Because the processing of step S11 requires more time than that of step S9 and step S10, it is performed for a longer period than steps S9 and S110 (a period approximately three times longer than the period for steps S1 through S10, for example).

First, in step S11, one of a plurality of the objects tracked in the binarized image data of the reference image (for example, the right image) is selected, and for example, the entire region enclosing the selected object by a circumscribed quadrangle is extracted as a search image R1 from the reference image (for example, the right image).

Next, in step S12, a search region for searching an image (corresponding image) R2 corresponding to the search image R1 is set in the image (for example, the left image) that corresponds to the reference image (for example, the right image), and a correlation calculation is performed to extract a corresponding image R2. Here, for example, a search region is set in the left image according to the vertex coordinates of the search image R1, a luminance difference summation value C (a, b) which shows the degree of correlation of the search image R1 in the search region is calculated, and the region where this summation value C (a, b) is lowest is extracted as the corresponding image R2. Moreover, this correlation calculation is performed for the gray scale image, not the image data obtained from the binarization process. In the case where historical position data is available for the same object, the search region can be narrowed based on the historical position data.

Next, in step S13, the positions of the centers of gravity of both the search image R1 and the corresponding image R2, and the parallax Δd at pixel level are calculated. Furthermore, the distance between the vehicle 10 and the object that is the distance z (m), (object distance) from the infrared cameras 2R and 2L to the object, is for example calculated, based on the base length of the cameras that is the horizontal distance D (m) between center positions of the each imaging device of the infrared cameras 2R and 2L, the focus distance of the camera that is the focus distance f (m) of each lens of the infrared cameras 2R and 2L, the pixel pitch p (m/pixel), and parallax Δd (pixel), as shown in the numerical expression 1.

$$z = \frac{f \times D}{\Delta d \times p} \quad (1)$$

Moreover, in step S14, when the calculation of the turning angle θr in step S10 and the calculation of the distance z in step S13 are completed, the coordinates in the image (x, y) and the distance z are converted to real space coordinates (X, Y, Z).

Here, as shown in FIG. 2 for example, the real space coordinates (X, Y, Z) are set by appointing the center position of the mounting position of the infrared cameras 2R and 2L in front of the vehicle 10 as the origin O, and the coordinates in the image are set so that the horizontal direction is the x direction and the vertical direction the y direction, with the center of the image as the origin. Furthermore, the coordinates (xc, yc) are the coordinates that have been converted from the coordinates (x, y) in the reference image (for example, the right image) into the coordinates in a virtual image obtained by aligning the origin O of the real space and the center of the image data so that they coincide, based on the relative position relationship between the mounting position of the infrared camera 2R and the origin O of the real space.

$$\begin{bmatrix} X \\ Y \\ Z \end{bmatrix} = \begin{bmatrix} xc \times z/F \\ yc \times z/F \\ z \end{bmatrix} \\ F = \frac{f}{p} \quad (2)$$

Next, in step S15, a turning angle correction is performed to compensate for the displacement of the object on the image caused by turning of the vehicle 10. This turning angle correction processing is to compensate for displacement by Δx in the x direction in the range of the image data taken by the infrared cameras 2R and 2L, when the vehicle 10, for example, turns to the left by an angle of θr within a period from time k to (k+1). As shown in the numerical expression (3) for example, the compensated coordinates (Xr, Yr, Zr) obtained as a result of compensating the real space coordinates (X, Y, Z) are set as new real space coordinates (X, Y, Z).

$$\begin{bmatrix} Xr \\ Yr \\ Zr \end{bmatrix} = \begin{bmatrix} \cos\theta r & 0 & -\sin\theta r \\ 0 & 1 & 0 \\ \sin\theta r & 0 & \cos\theta r \end{bmatrix} \begin{bmatrix} X \\ Y \\ Z \end{bmatrix} \quad (3)$$

Next, in step S16, an approximated straight line LMV, which corresponds to the relative movement vector between the object and the vehicle 10, is calculated from N (N=approximately 10, for example) pieces of real space position data constituting time series data, having undergone turning angle correction, obtained for the same object during a predetermined monitoring period ΔT.

In this step S16, the most recent coordinates P (0) (X (0), Y (0), Z (0)) and the coordinates P prior to sampling (prior to the predetermined period ΔT) (N−1)=(X (N−1), Y (N−1), Z (N−1)) are corrected to the positions on the approximated straight line LMV, and the corrected coordinates Pv (0)=(Xv (0), Yv (0), Zv (0)) and Pv (N−1)=(Xv (N−1), Yv (N−1), Zv (N−1)) are calculated.

This procedure obtains the relative movement vector as a vector moving from the coordinates Pv (N−1) towards Pv (0).

By obtaining a relative movement vector by calculating an approximated straight line which approximates the relative movement track of the object relative to the vehicle 10 from a plurality (for example, N) pieces of real space position data within the predetermined monitoring period ΔT, it is possible to estimate with better accuracy whether or not there is a possibility of collision between the vehicle 10 and an object, reducing the effect of position detection errors.

Next, in step S17, in the warning determination processing based on the possibility of collision between the detected object and the vehicle 10, it is determined whether or not the detected object is subject to warning.

When the result of this determination is "NO", the flow returns to step S1, and the processing of step S1 to step S17 described above is repeated.

On the other hand, when the result of this determination is "YES", the flow proceeds to step S18.

Moreover, in step S18, in the warning output determination process corresponding to whether or not the driver of the vehicle 10 is operating the brake based on the output BR of the brake sensor 5, it is determined whether or not the warning output is required.

When the determination result in step S18 is "NO", for example, in the case where a degree of acceleration Gs (positive in the deceleration direction) is greater than a predetermined threshold GTH while the driver of the vehicle 10 is operating the brake, it is determined that the collision can be avoided by the brake operation, the flow returns to step S1, and the processing of step S1 to step S18 described above is repeated.

On the other hand, when the determination result in step S18 is "YES", for example in the case where a degree of acceleration Gs (positive in the deceleration direction) is not greater than the predetermined threshold GTH while the driver of the vehicle 10 is operating the brake, or in the case where the driver of the vehicle 10 is not operating the brake, the possibility of collision is determined to be high and the flow proceeds to step S19.

The predetermined threshold value GTH is a value which corresponds to acceleration which would result in the vehicle 10 stopping after a traveling distance not greater than the distance Zv (0) between the object and the vehicle 10 in the case where the degree of acceleration Gs during the brake operation is maintained.

Then, in step S19, an audible sound warning is output, for example, through the speaker 6, or visual display warning is output, for example, through the display device 7, or tactual warning is output by generating a fastening force that is tactually perceivable to the driver with generation of a predetermined tension to the seatbelt, or by generating vibration (steering vibration), to a steering wheel for example, that is tactually perceivable to the driver.

Next, in step S20, for example, the image data obtained from the infrared camera 2R is output to the display device 7 to display the relatively approaching object as a highlighted image.

Hereunder, the warning determination processing in step S17 mentioned above is described, with reference to the attached drawings.

Figure 4:
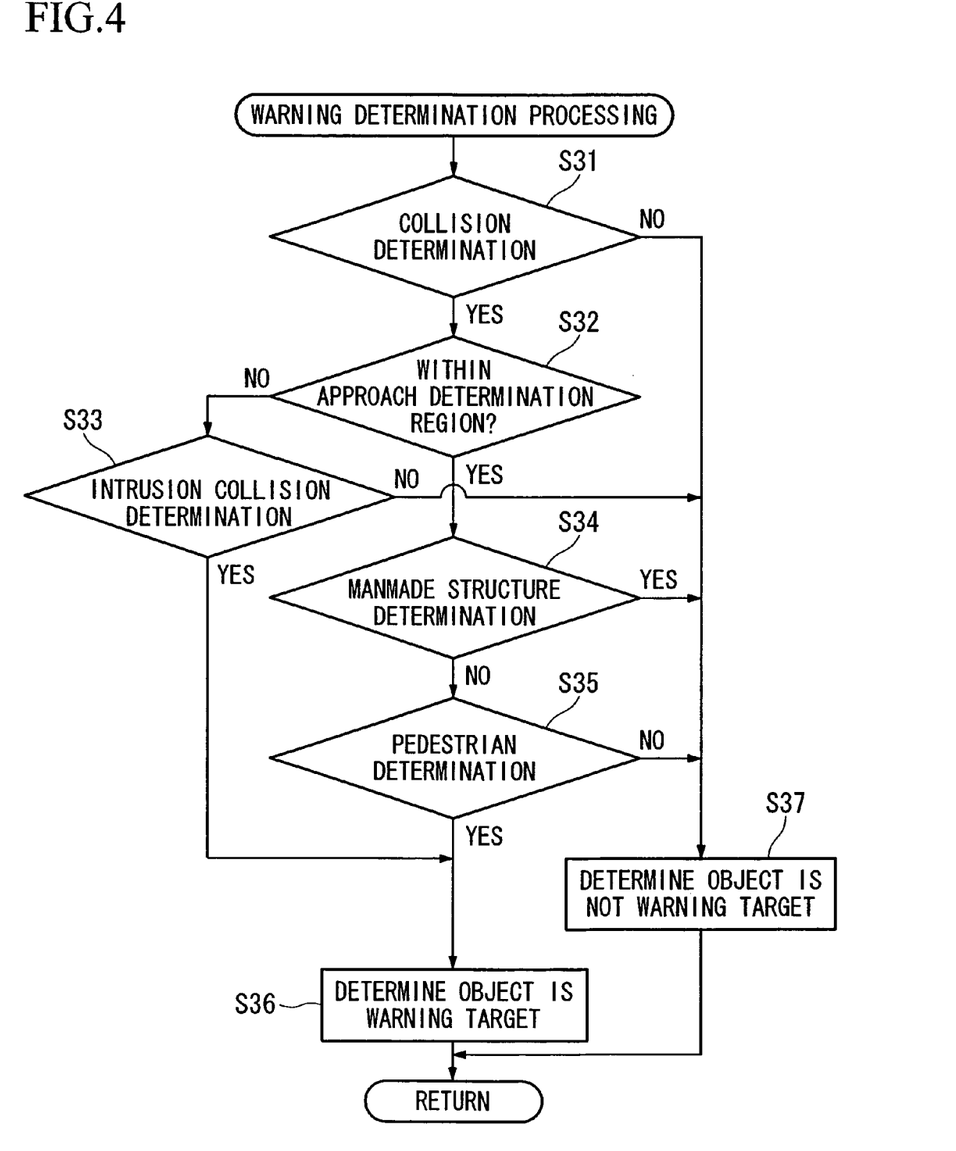
FIG. 4 is a flowchart showing the warning determination processing shown in FIG. 3.
Figure 5:
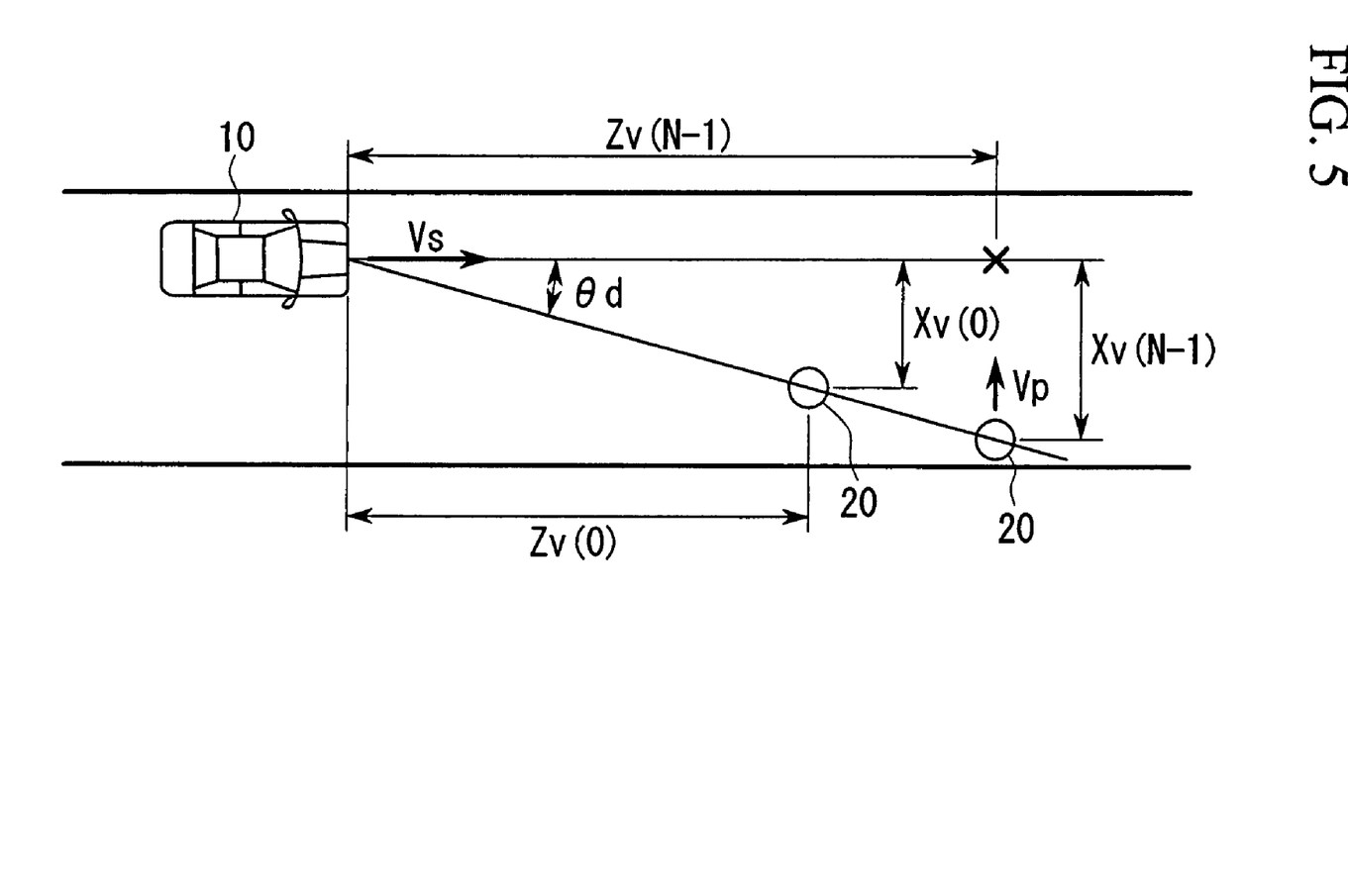
FIG. 5 is a diagram showing an example of a relative position between a vehicle and an object.

This warning determination processing determines the possibility of a collision between the vehicle 10 and a detected object based on the collision determination processing, processing to determine whether or not an object is in an approach determination region, intrusion collision determination processing, manmade structure determination processing, and pedestrian determination processing, as shown in FIG. 4. The description below makes reference to an example as shown in FIG. 5, in which an object 20 is traveling at a velocity Vp in the direction at a substantially 90° angle relative to the traveling direction of the vehicle 10 (for example the Z direction).

First of all, in step S31 shown in FIG. 4, collision determination processing is performed. This collision determination processing calculates the relative velocity Vs of the vehicle 10 and the object 20 in the Z direction in the case where, as in FIG. 5, the object 20 approaches from a distance of Zv (N−1) to a distance of Zv (0) during a time period ΔT, and assuming that the heights of both the vehicle 10 and the object 20 are not greater than a predetermined ground clearance H and the relative velocity Vs is maintained, determines whether or not the vehicle 10 and the object 20 will collide within the predetermined time allowance Ts.

When the determination result is "NO", the flow proceeds to step S37 that is described later.

On the other hand, when the result of this determination is "YES", the flow proceeds to step S32.

Also, the time allowance Ts is intended to allow determination of the possibility of a collision in advance of the estimated collision time by a predetermined length of time Ts, and is set to approximately 2 to 5 seconds, for example. Furthermore, the predetermined ground clearance H is set to approximately twice the height of the vehicle 10, for example.

Figure 6:
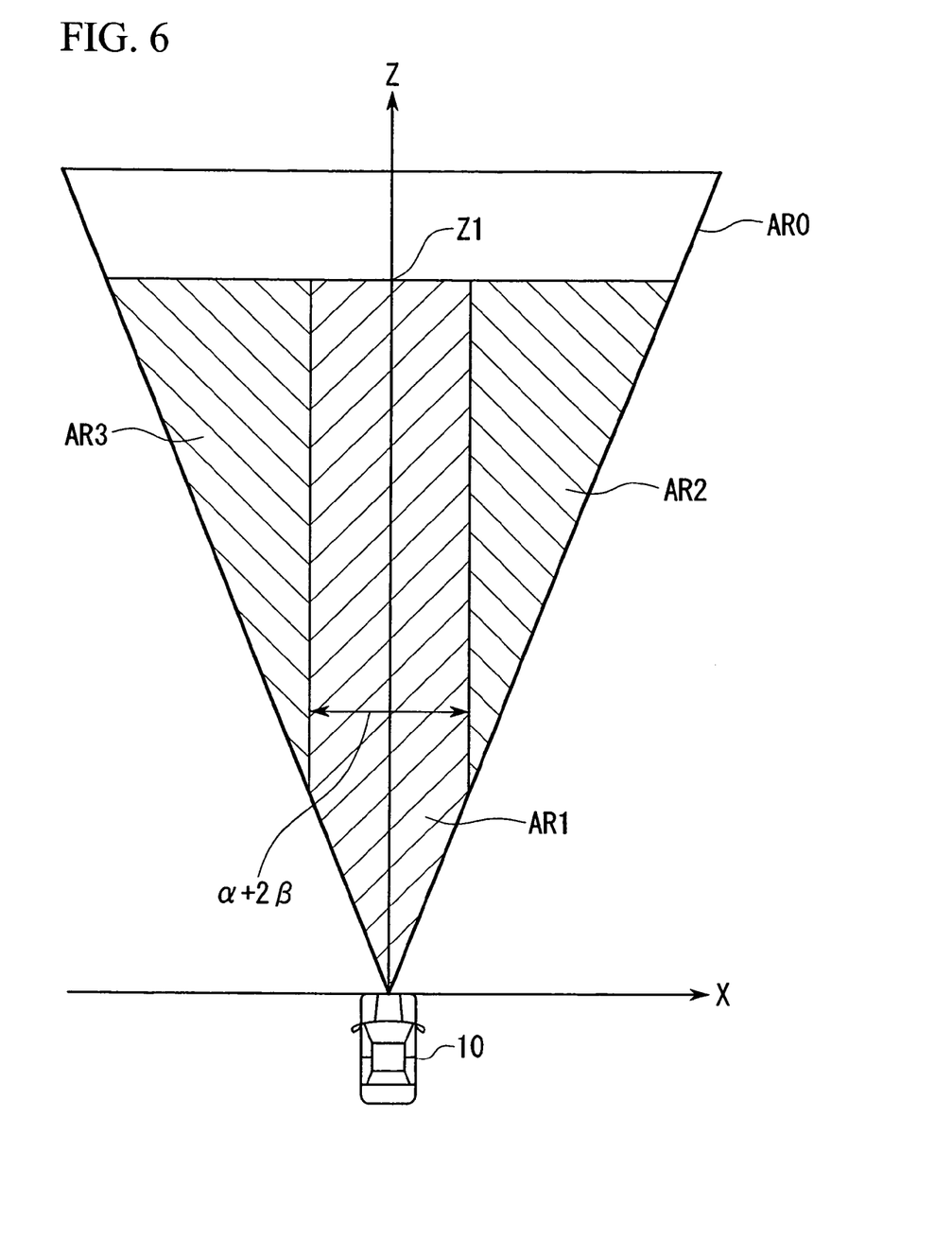
FIG. 6 is a diagram showing an example of the classification of the regions such as an approach determination region set in front of the vehicle.

Next, in step S32, whether or not the object is within an approach determination region is determined. As shown in FIG. 6 for example, in a region AR0 which can be monitored by the infrared cameras 2R and 2L, this determination processing determines whether or not the object is within a region AR1, which is a distance (Vs×Ts) closer to the vehicle 10 than a front position Z1, and which has a total width (α+2β) with predetermined width β (for example approximately 50 to 100 cm) added to both sides of the width α of the vehicle 10 in the vehicle lateral direction (that is the X direction), and which has the predetermined ground clearance H; that is, an approach determination region AR1 where there is a high likelihood of a collision occurring with the vehicle 10 if the object stays in that location.

When the determination result is "YES", the flow proceeds to step S34 that is described later.

On the other hand, when the result of this determination is "NO", the flow proceeds to step S33.

Then in step S33, intrusion collision determination processing is performed to determine whether or not there is a possibility of the object entering the approach determination region and colliding with the vehicle 10. As shown in FIG. 6 for example, this intrusion collision determination processing determines whether or not there is a possibility of the object in intrusion determination regions AR2 and AR3 at the ground clearance H, where these regions are outside the approach determination region AR1 in the vehicle lateral direction (that is, the x direction), moving and entering the approach determination region AR1 and colliding with the vehicle 10.

When the determination result is "YES", the flow proceeds to step S36, which is described later.

On the other hand, when the determination result is "NO", the flow proceeds to step S37, which is described later.

Then, in step S34, manmade structure determination processing is performed to determine whether the object is a manmade structure or not. This manmade structure determination processing determines that the object is a manmade structure and excludes the object from the warning determination if certain characteristics such as those mentioned below are detected, meaning that the object cannot be a pedestrian.

When the result of this determination is "NO", the flow proceeds to step S35.

On the other hand, when the result of this determination is "YES", the flow proceeds to step S37.

Then, in step S35, pedestrian determination processing is performed to determine whether the object is a pedestrian or not.

When the result of the determination in step S35 is "YES", the flow proceeds to step S36.

On the other hand, when the result of the determination in step S35 is "NO", the flow proceeds to step S37, which is described later. Then, in step S36, when in step S33 there is a possibility of the object entering the approach determination region and colliding with the vehicle 10, (YES in step S33), or in step S35 the object determined possibly to be a pedestrian is not a manmade structure, (YES in step S35), it is determined that there is a possibility of the vehicle 10 colliding with the detected object and a warning is justified, and the processing is terminated.

In step S37, on the other hand, when in step S31 there is no possibility of a collision between the vehicle 10 and the object within the predetermined time allowance Ts, (NO in step S31), or in step S33 there is no possibility of the object entering the approach determination region and colliding with the vehicle 10, (NO in step S33), or in step S34 a determination is made that the object is a manmade structure, (YES in step S34), or when the object determined not to be a manmade structure in step S34 is not a pedestrian, (NO in step S35), it is determined that there is no possibility of a collision between the object and the vehicle 10 and a warning is not justified, and the processing is terminated.

Hereinafter, as the manmade structure determination processing in step S34 mentioned above, processing to distinguish between a manmade structure having a shape similar to a pedestrian, especially a similar shape and height of a head that emits heat, and a pedestrian is described.

Figure 7:
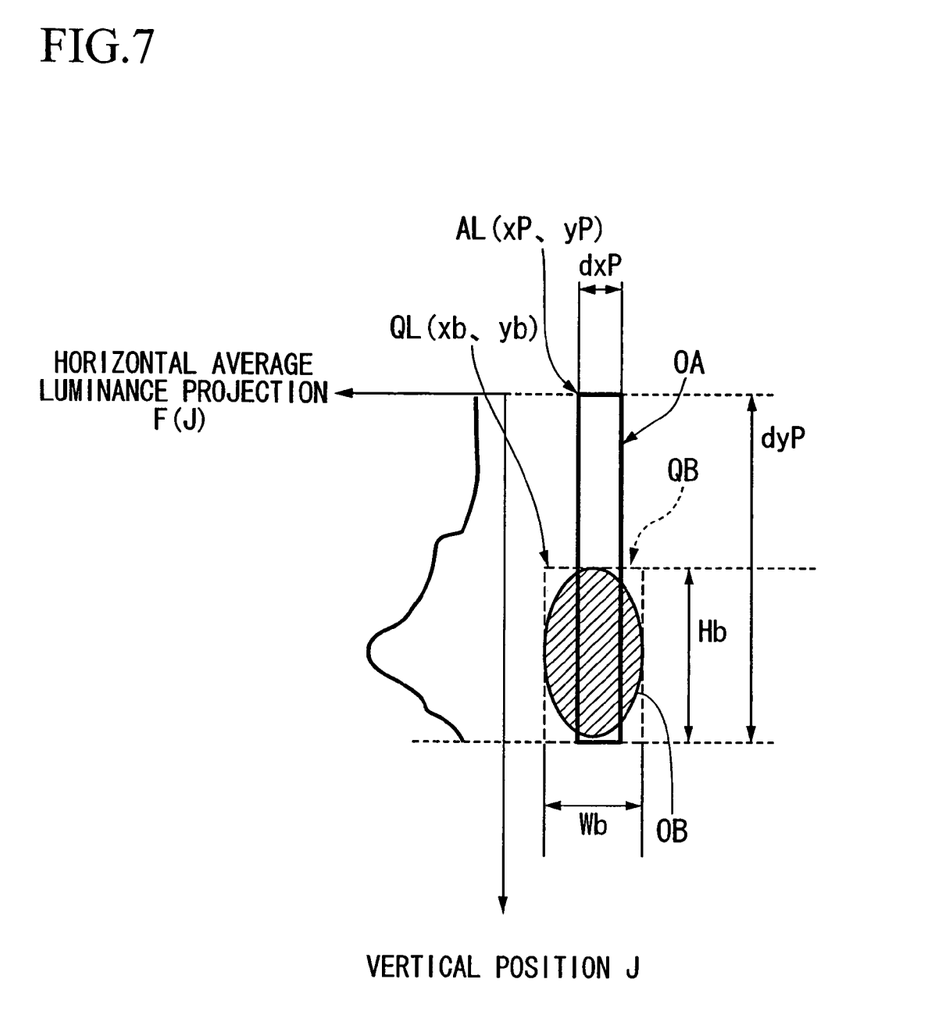
FIG. 7 is a graph showing an example of the horizontal average luminance projection at a region including at least a portion of the binarized object.

As shown in FIG. 7 for example, this manmade structure determination processing sets a target region (mask) OA for luminance status quantity calculation that is a region including at least a portion of a binarized object OB in the reference image (for example, the right image obtained from the infrared camera 2R).

For example, with respect to the coordinates (xb, yb) of the upper left point QL of the circumscribed quadrangle QB of the binarized object OB, the width Wb of the circumscribed quadrangle, and the height Hb of the circumscribed quadrangle, if the width dxP of the mask OA is made a prescribed value (for example, 2 pixels) and the height dyP of the mask OA is made a prescribed value (for example, a value twice the height Hb of the circumscribed quadrangle=2×Hb), the coordinates (xP, yP) of the upper left point AL of the mask OA are (xP=xb+Wb/2−1, yP=yb−Hb).

Then, fluctuation (horizontal average luminance projection) F (J) is calculated in relation to the vertical position J of an average value of luminance value (horizontal average luminance) along the horizontal direction (that is, the x direction) for each vertical position J (J is an appropriate integer) in the vertical direction (that is, the y direction, with vertically downward as the positive direction).

Figure 8:
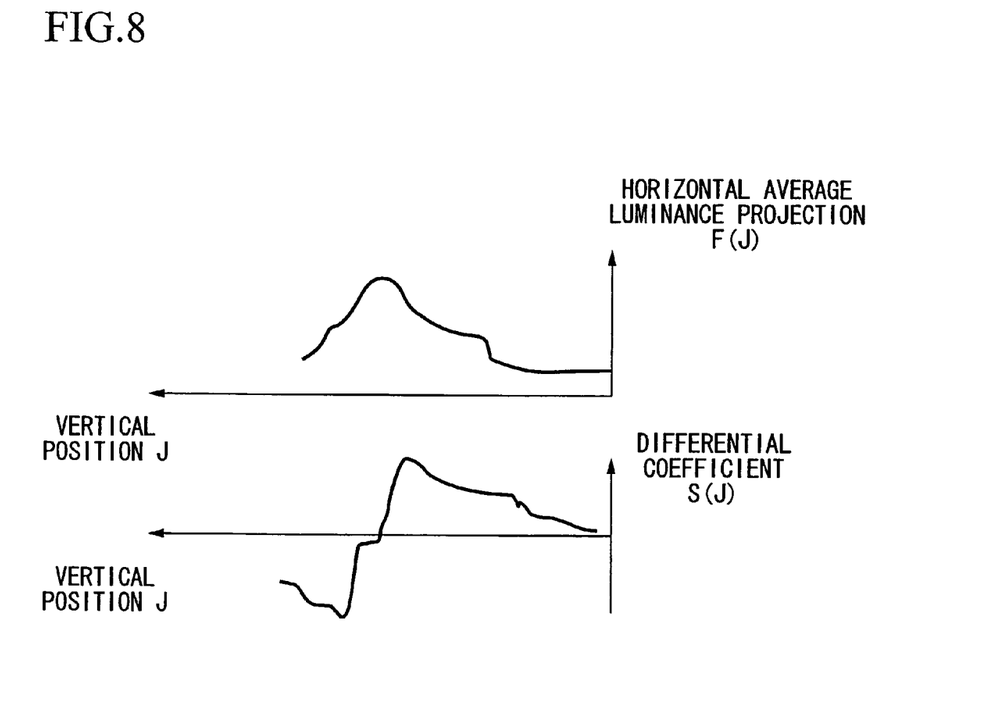
FIG. 8 is a graph showing an example of the horizontal average luminance projection and the differential coefficient.

Then, as shown in FIG. 8, fluctuation (differential coefficient) S (J) of the slope is calculated in relation to the vertical position J with respect to the horizontal average luminance projection F (J). For example, the slope of the first-order approximation straight line of the horizontal average luminance projection F (J) is calculated at each predetermined vertical width in each vertical position J, and set as the differential coefficient S (J) at each vertical position J.

Then, the position of the approximately maximum value (maximum peak position) j_en and the position of the approximately minimum value (minimum peak position) j_st of the horizontal average luminance projection F (J) are found.

Here, when detecting the maximum peak position j_en, as a first determination processing, it is first determined whether or not an edge filter output value eg_cal obtained by applying an appropriate edge filter to the horizontal average luminance projection F (J) is greater than a predetermined threshold value EG_TH (for example, 10).

Furthermore, as a second determination processing, it is determined whether or not the luminance difference (F(J)−F (J−1)) at an adjacent vertical position in the horizontal average luminance projection F (J) is greater than a predetermined difference KDIFF_TH (for example, −10).

Figure 9:
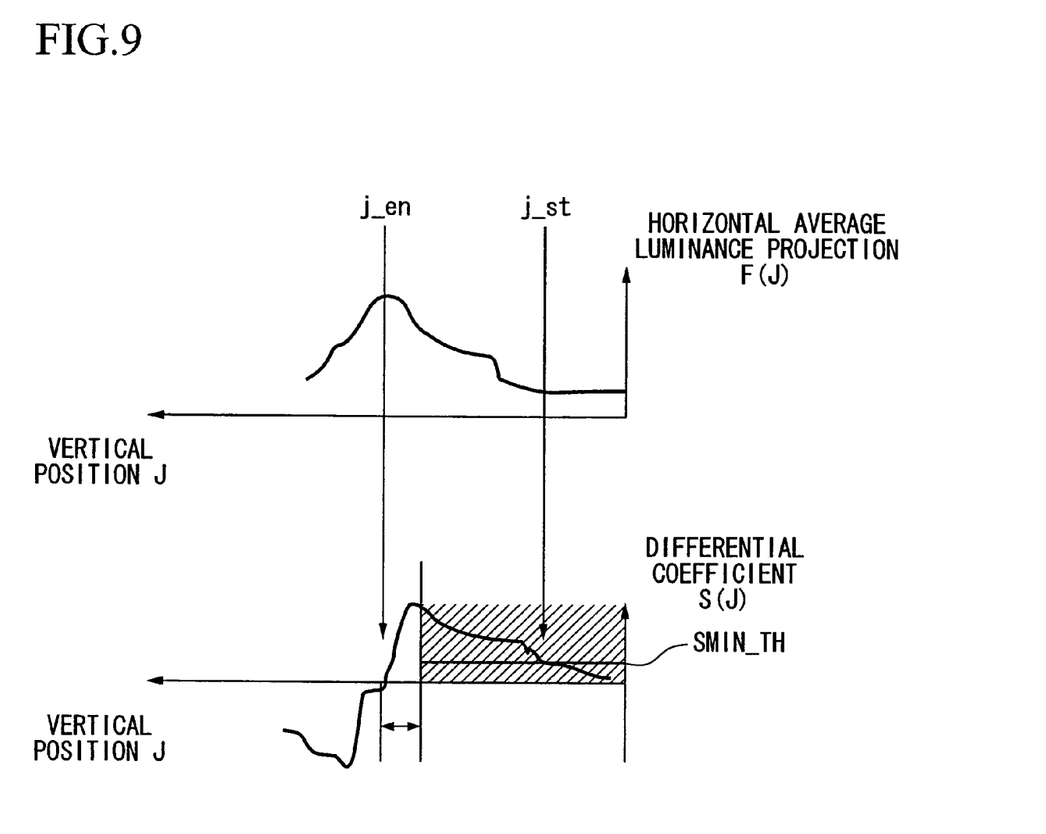
FIG. 9 is a graph showing an example of the maximum peak position and the minimum peak position.

Then, in the case of the determination result of the first determination processing and the determination result of the second determination processing being "YES", that is, eg_cal>EG_TH and (F (J)−F (J−1))>KDIFF_TH, the position where the edge filter output value eg_cal is a maximum is set as the maximum peak position j_en, as shown in FIG. 9.

Meanwhile, in the case of either one of the determination result of the first determination processing and the second determination processing being "NO", a maximum peak position j_en is not considered to exist.

Also, when detecting the minimum peak position j_st, in the region where the vertical position J is less than the maximum peak position j_en, first, as a third determination processing, it is determined whether or not the differential coefficient S (J) and the differential coefficient S (J−1) at an adjacent vertical position is less than a predetermined threshold value SMIN_TH.

Furthermore, as a fourth determination processing, it is determined whether or not the horizontal average luminance projection F (J) with respect to the vertical position J in the third determination processing is less than a predetermined threshold value KIDO_TH (for example, 100 tones).

Then, in the case of the determination result of the third determination processing and the determination result of the fourth determination processing being "YES", that is, S (J)<SMIN_TH, S (J−1)<SMIN_TH and F (J)<KIDO_TH, the corresponding vertical position J is set as the minimum peak position j_st, as shown for example in FIG. 9.

Meanwhile, in the case of either one of the determination result of the third determination processing and the fourth determination processing being "NO", a minimum peak position j_st is not considered to exist.

Then, it is determined whether or not the interval length (|maximum peak position j_en−minimum peak position j_st|×pixel pitch p) in the actual space corresponding to the difference between the maximum peak position j_en and the minimum peak position j_st is longer than a predetermined length SLOPE_TH (for example, 1 m).

If this determination result is "YES", that is, (|j_en−j_st|×p)>SLOPE_TH, it is determined for example that the thermal distribution in the vertical direction is relatively moderate, and therefore that the binarized object is a manmade structure, and the processing is terminated.

Meanwhile, if this determination result is "NO", that is, (|j_en|j_st|×p)≦SLOPE_TH, it is determined for example that the thermal distribution in the vertical direction is relatively steep, and therefore that the binarized object is other than a manmade structure extending in the vertical direction, such as a pedestrian not extending in the vertical direction, and the processing is terminated.

As stated above, according to the vehicle surroundings monitoring apparatus of the present embodiment, in the case that the interval length in the actual space corresponding to the difference between the maximum peak position j_en and the minimum peak position j_st is longer than a predetermined length SLOPE_TH (for example, 1 m) allowed as physical features of a human body, the thermal distribution in the vertical direction is determined to be excessively moderate, so that it can be precisely distinguished as being a manmade structure.

In the embodiment described above, in the case of the interval length (|maximum peak position j_en−minimum peak position j_st|×pixel pitch p) in the actual space being longer than the predetermined length SLOPE_TH (for example, 1 m), the binarized object is distinguished as being a manmade structure, but it is not limited thereto. Moreover, in a gray scale image, it is determined whether or not the aspect ratio of the region of relatively high luminance according to the binarized object is higher than a predetermined upper limit or lower than a predetermined lower limit, and in accordance with this determination result, it may be determined whether or not the binarized object is a manmade structure, (for example, a pedestrian or the like).

Figure 10:
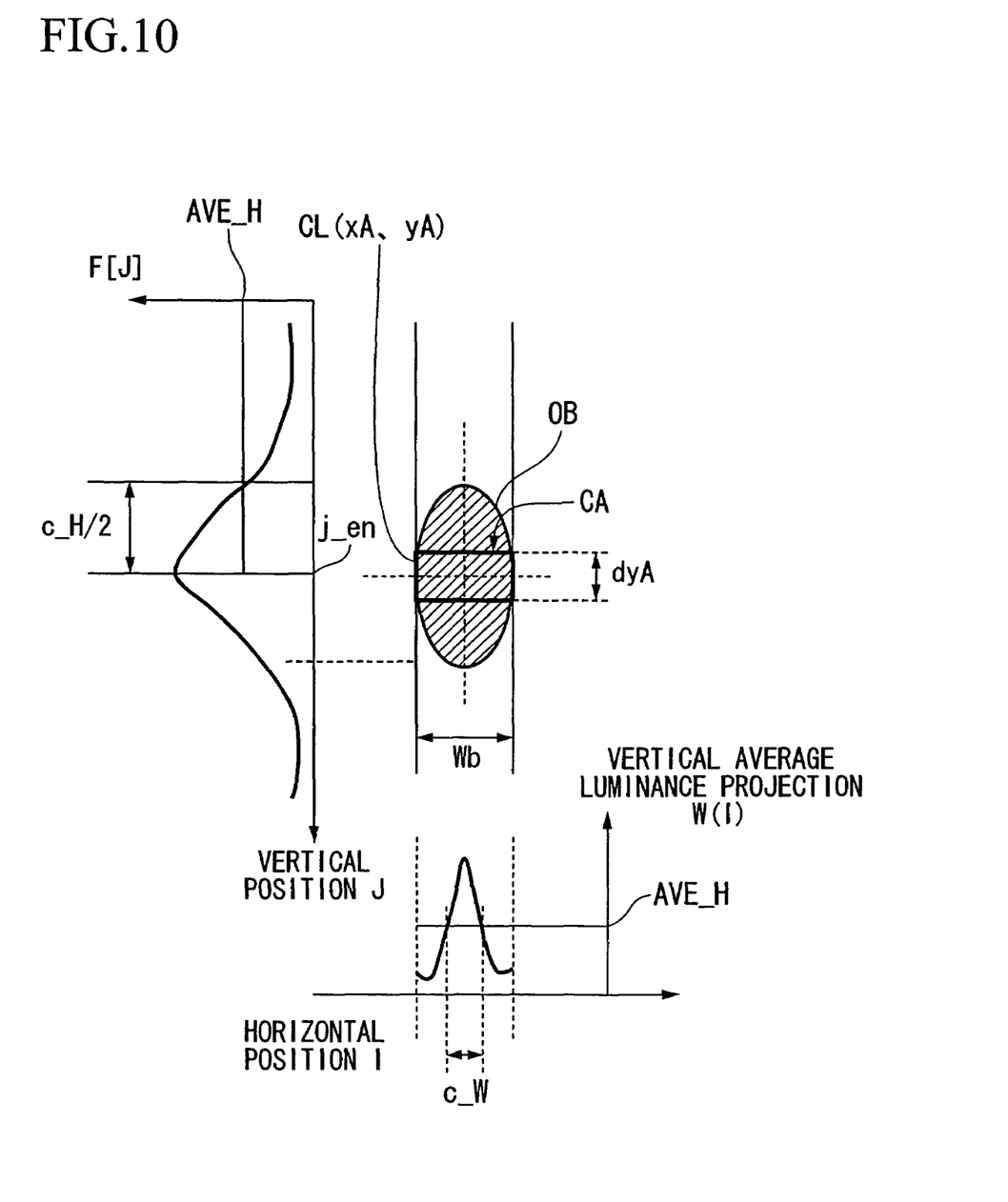
FIG. 10 is a graph showing an example of the horizontal average luminance projection at a region including at least a portion of the binarized object and the vertical average luminance projection.

In this modification, as shown for example in FIG. 10, when calculating the vertical width c_H and the horizontal width c_W of the region of relatively high luminance according to the binarized object, first, based on the horizontal average luminance projection F (J), the maximum peak position j_en and minimum peak position j_st, the average value of the horizontal average luminance projection F (J) (average luminance value) AVE_H (=(F(j_st)+ . . . +F(j_en))/((j_st)−(j_en+1))) is calculated.

Then, in the horizontal average luminance projection F (J), a value approximately twice the width of the region where the luminance value is greater than the average luminance value AVE_H is set as the vertical width c_H.

Next, a mask CA with a width dyA being a predetermined value (for example, 2 pixels) and a height dxA being a predetermined value (for example, a value of twice the width Wb of a circumscribed quadrangle=2×Wb) is set centered on the maximum peak position j_en, and fluctuation (vertical average luminance projection) W (I) is calculated in relation to the horizontal position I of the average value of luminance value (vertical average luminance) along the vertical direction (that is, the y direction) for each horizontal position I (I is an appropriate integer) in the horizontal direction (that is, the x direction).

Then, the value of the width of the region where the luminance value in the vertical average luminance projection W (I) is greater than the average luminance value AVE_H is set as the horizontal width c_W.

Then, it is determined whether or not the aspect ratio (=vertical width c_H/horizontal width c_W) is greater than a predetermined upper limit value R_THU (for example, 2), or whether or not the aspect ratio (=vertical width c_H/horizontal width c_W) is smaller than a predetermined lower limit R_THL (for example, 0.5).

If this determination result is "YES", that is, in the case of the interval length (|maximum peak position j_en−minimum peak position j_st|×pixel pitch p) in the actual space being longer than the predetermined length SLOPE_TH (for example, 1 m), and the region of relatively high luminance according to the binarized object is excessively narrow or wide, the binarized object is determined to be a manmade structure and the processing is terminated.

Meanwhile, in the case of the determination result being "NO", even if the interval length (|maximum peak position j_en−minimum peak position j_st|×pixel pitch p) in the actual space is longer than the predetermined length SLOPE_TH (for example, 1 m), if the aspect ratio is within a predetermined range of not less than the predetermined lower limit R_THL (for example, 0.5) and not more than the predetermined upper limit R_THU (for example, 2), the binarized object is determined not to be a manmade structure extending in the vertical direction or a manmade structure extending in the horizontal direction, but to be such as a pedestrian excessively extending neither in the vertical direction nor in the horizontal direction, and the processing is terminated.

In this modification, in addition to the interval length in the actual space corresponding to the difference between the maximum peak position j_en and the minimum peak position j_st, by determining whether or not it is a manmade structure based on the aspect ratio of the region of relatively high luminance according to the binarized object, the degree of reliability in determining the type of object can be enhanced.

In the embodiment described above, determination processing was carried out for an interval in an actual space corresponding to the difference between the maximum peak position j_en and the minimum peak position j_st, but it is not limited thereto. For example, determination processing may be executed for an interval between the position of the approximately maximum luminance value and the position of the approximately minimum luminance value allowing determination of the type of object, such as an interval in the actual space corresponding to the difference between a position in the predetermined range including the maximum peak position j_en and a position in the predetermined range including the minimum peak position j_st.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle surroundings monitoring apparatus that extracts a body present in the surroundings of a vehicle as an object, based on an image captured by an infrared imaging device, comprising:
   a binarized object extraction device that extracts a binarized object from image data obtained by binarizing a gray scale image of the image;
   a region setting device that sets a region including at least a portion of the binarized object extracted by the binarized object extraction device on the gray scale image;
   a luminance status quantity calculation device that calculates a luminance status quantity of the region set by the region setting device;
   an interval status quantity calculation device that calculates an interval status quantity according to an interval between a position of a substantially maximum luminance value and a position of a substantially minimum luminance value within the region based on the luminance status quantity calculated by the luminance status quantity calculation device; and
   an object type determination device that determines a type of the object based on the interval status quantity calculated by the interval status quantity calculation device.

2. The vehicle surroundings monitoring apparatus according to claim 1, wherein the interval status quantity is the length of the interval.

3. The vehicle surroundings monitoring apparatus according to claim 1, further comprising:
   a prescribed region setting device that sets a prescribed region according to the binarized object extracted by the binarized object extraction device on the gray scale image, based on the luminance status quantity calculated by the luminance status quantity calculation device;
   an aspect ratio calculation device that calculates the aspect ratio of the prescribed region set by the prescribed region setting device; and
   an aspect ratio determination device that determines whether or not the aspect ratio calculated by the aspect ratio calculation device is not less than a prescribed upper limit or not more than a lower limit,
   wherein the object type determination device determines the type of the object based on the determination result of the aspect ratio determination device, in addition to the interval status quantity calculated by the interval status quantity calculation device.

4. The vehicle surroundings monitoring apparatus according to claim 1, further comprising:
   a pedestrian recognition device that recognizes pedestrians present in the surroundings of a vehicle based on the image, the pedestrian recognition device executing pedestrian recognition processing on the object when the object is determined to be something other than a manmade structure, or to be a pedestrian, by the object type determination device.

5. The vehicle surroundings monitoring apparatus according to claim 1, further comprising:
   a warning output device that outputs a warning directed to the object when the object is determined by the object type determination device to be something other than a manmade structure or to be a pedestrian.

* * * * *